United States Patent
Lis et al.

(10) Patent No.: US 7,251,299 B2
(45) Date of Patent: Jul. 31, 2007

(54) TIME DELAY ESTIMATOR

(75) Inventors: Fabian Lis, Newton, MA (US); Joshua Kablotsky, Sharon, MA (US); Haim Primo, Gane Tikway (IL)

(73) Assignee: Analog Devices, Inc., Norwood, MA (US)

(*) Notice: Subject to any disclaimer, the term of this patent is extended or adjusted under 35 U.S.C. 154(b) by 750 days.

(21) Appl. No.: 10/444,266

(22) Filed: May 23, 2003

(65) Prior Publication Data

US 2004/0037432 A1    Feb. 26, 2004

Related U.S. Application Data

(60) Provisional application No. 60/382,717, filed on May 23, 2002.

(51) Int. Cl.
  H04D 1/00    (2006.01)
  H04L 27/06   (2006.01)
(52) U.S. Cl. ............... 375/343; 375/341; 375/342
(58) Field of Classification Search ........... 375/343, 375/341, 342, 142, 143, 152, 144, 346, 349, 375/253, 340, 344; 370/289; 708/492, 322
See application file for complete search history.

(56) References Cited

U.S. PATENT DOCUMENTS

| | | | | |
|---|---|---|---|---|
| 4,007,330 A | * | 2/1977 | Winters | 375/330 |
| 4,173,759 A | * | 11/1979 | Bakhru | 342/382 |
| 4,191,853 A | * | 3/1980 | Piesinger | 106/419 |
| 4,862,450 A | * | 8/1989 | Guidoux | 370/289 |
| 5,764,690 A | * | 6/1998 | Blanchard et al. | 375/147 |
| 5,787,118 A | | 7/1998 | Ueda | |
| 5,805,584 A | * | 9/1998 | Kingston et al. | 370/342 |
| 6,067,295 A | | 5/2000 | Bahai et al. | |

* cited by examiner

*Primary Examiner*—Mohammed Ghayour
*Assistant Examiner*—Qutub Ghulamali
(74) *Attorney, Agent, or Firm*—Gauthier & Connors LLP

(57) ABSTRACT

A system for time delay estimation in a discrete time processing system includes a cross correlator that performs cross correlation on a first signal and a second signal, and provides a cross correlated output signals indicative thereof. A lag smoother receives the cross correlated output signals, and provides lag smoothed output signals indicative thereof. A select logic module selects a pre-defined number of signal values from a respective set indicative of the lag smoothed output signals to compute the time delay estimation associated with the first and second signals.

25 Claims, 5 Drawing Sheets

TIME DELAY ESTIMATOR

PRIORITY INFORMATION

This application claims priority from U.S. Provisional application designated Ser. No. 60/382,717 filed May 23, 2002 and entitled Time Delay Estimator, which is hereby incorporated by reference.

BACKGROUND OF THE INVENTION

The invention relates to the field of communications, and in particular to the field of digital communications and computing/estimating the time delay of a signal transmitted over a communication channel.

As known, bothersome echoes occur in communication systems, such as telephone systems, that operate over long distances or in systems that employ long processing delays, such as digital cellular systems. The echoes are the result of electric leakage in the four-to-two/two-to-four wire hybrid circuit, due to an impedance mismatch in the hybrid circuit between the local loop wire and the balance network. To reduce the echoes, communication systems typically include one or more echo cancellers.

FIG. 1 is a block diagram illustration of a communication system 10 that connects at least two subscribers 12, 14. The first subscriber 12 is typically connected to the communication system 10 via a two-wire line 16 and a hybrid circuit 18. The hybrid circuit 18 connects the two-wire line 16 to the four-wire lines 20, 22. The first four-wire line 20 provides a signal to the second subscriber via a second hybrid circuit 24 and a two-wire line 26. Similarly, signals from the second subscriber 14 are routed to the first subscriber 12 over the two-wire line 26, the second hybrid circuit 24 and the four-wire line 20, 22. In one application, the hybrid circuits may be located in the telephone company central offices. To reduce the echo signals coupled by the hybrid circuit due to impedance mismatches, echo cancellers 30, 32 are included to attenuate the undesirable echoes.

Echo cancellers typically include an adaptive filter that generates an estimate of the echo and subtracts the estimate from the return signal. Like any adaptive discrete time filter, the tap weights of the filter are adjusted based upon the difference between the estimate of the echo signal and the return signal. The adaptive filter employs an adaptive control algorithm to adjust the tap weights in order to drive the value of the difference signal to zero or a minimum value.

A problem with prior art echo cancellers is that they are required to handle echo tail lengths of up to 128 milliseconds. However, in order to meet this requirement the adaptive filter would have to have 1024 taps. Of course providing such a filter having such a large numbers of taps leads to processing complexity. Specifically, if the adaptive filter is implemented in a processor, implementing a filter having 1024 taps requires a lot of processing. Similarly, if the adaptive filter is implemented in an application specific integrated circuit (ASIC), implementing a filter having 1024 taps requires a lot of gates.

There is a need for a time delay estimator that maybe used by an echo canceller that includes a computationally efficient adaptive filter, including a time delay estimator.

SUMMARY OF THE INVENTION

According to one aspect of the invention, there is provided a system for time delay estimation in a discrete time processing system. The system includes a cross correlator that performs cross correlation on a first signal and a second signal, and provides a cross correlated output signals indicative thereof. A lag smoother receives the cross correlated output signals, and provides lag smoothed output signals indicative thereof. A select logic module selects a predefined number of signal values from a respective set indicative of the lag smoothed output signals to compute the time delay estimation associated with the first and second signals.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
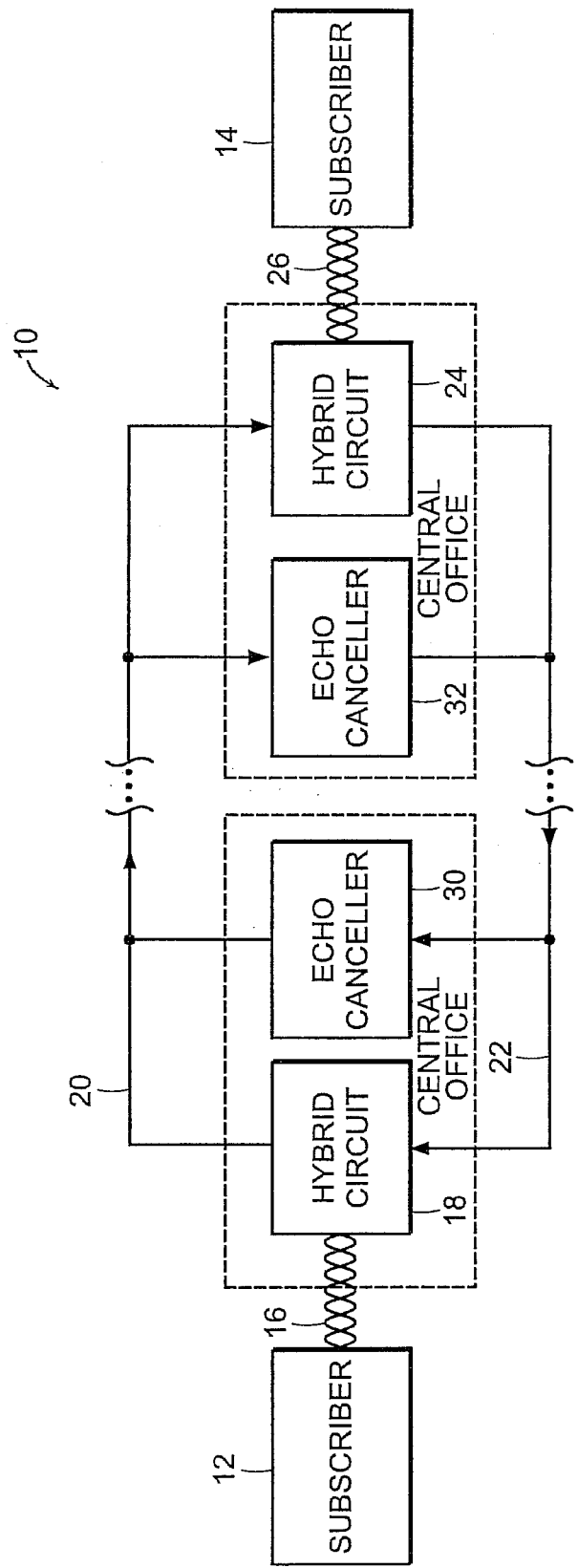
FIG. 1 is a block diagram illustration of a communication system that includes an echo canceller.
Figure 2:
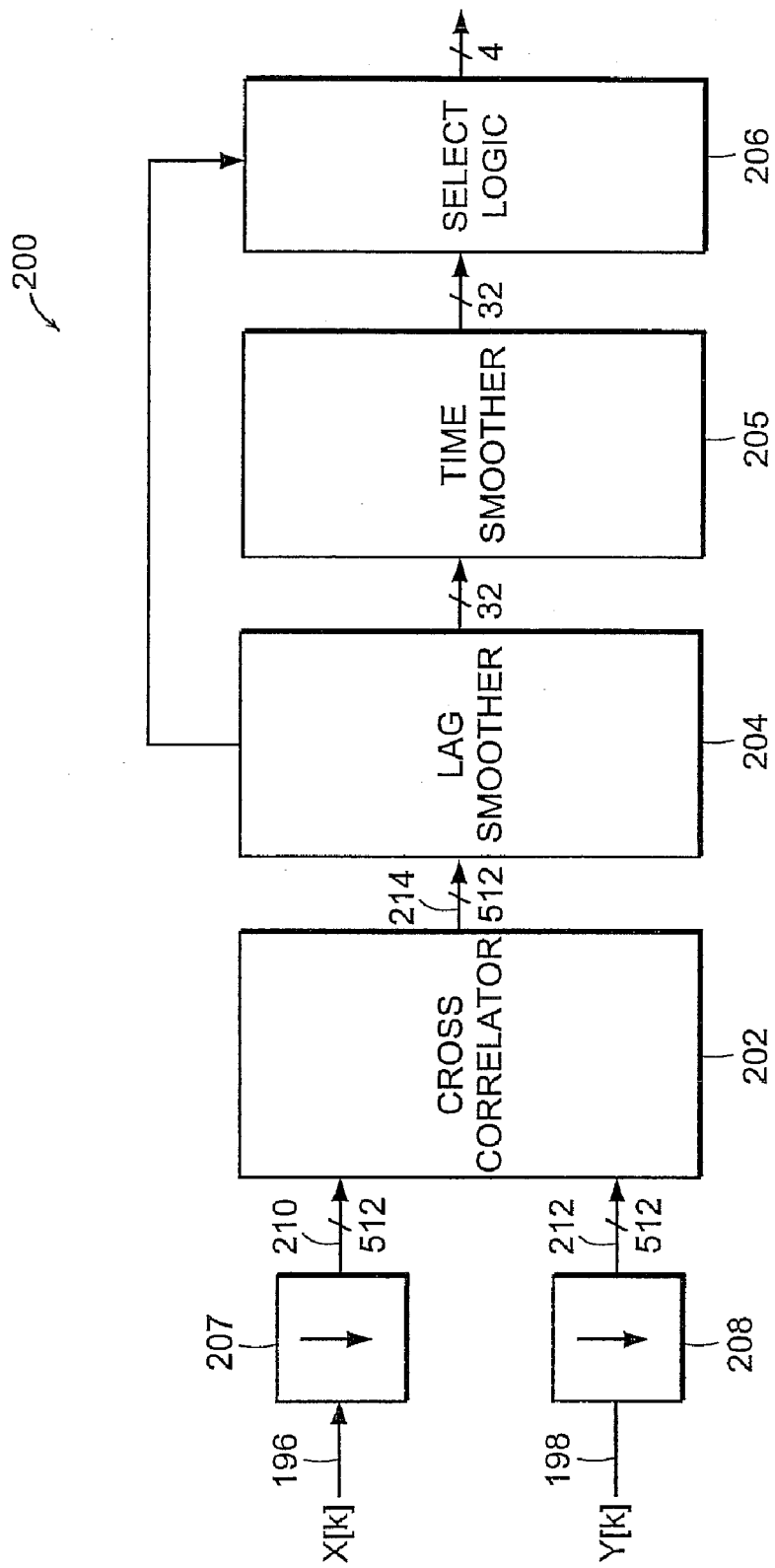
FIG. 2 is a block diagram illustration of a time delay estimator.

FIG. 2 is a block diagram illustration of a time delay estimator 200, which receives a transmitted signal x[k] and a received signal y[k] on lines 196 and 198, respectively. When the transmitted signal x[k] is transmitted over a communication channel it typically experiences a time delay. The time delay may impose a decoding constraint at the receiver end.

The transmitted signal x[k] and its associated received signal y[k] may be voice signals (e.g., sampled at 8 kHz). However, one of ordinary skill in the art will recognize of course that the time delay estimator 200 of the present invention is not limited to this context. The invention may use other types of signals, such as signals used in communication networks, radar systems, or the like.

The time delay estimator 200 receives the transmitted signal x[k] and its associated received signal y[k]. Since voice signals have most of their energy in the lower half region of their bandwidth, they can be downconverted to 4 kHz (i.e., decimated by a factor of two). The time delay estimator 200 includes a first decimator 207, and a second decimator 208 that receives the signals x[k] and y[k], respectively. The decimators 207, 208 may downconvert the input signals by a factor of two. However, it is contemplated that other decimation factors may also be used. Therefore, each block of input data to the decimators 207, 208 includes, for example, 1024 samples, while the resultant decimated output signals each include 512 samples per block. The invention may also use signals x[k] and y[k] that have more or less samples per block.

The decimators 207, 208 provide a first decimated output signal on a line 210 and a second decimated output signal on a line 212, respectively. The decimated output signals are input to a cross correlator 202. The cross correlator 202 may also perform mathematical operations on the downconverted outputs, such as averaging. The cross correlator 202 provides on output signal on a line 214, wherein the output signal on the line 214 includes signal values (e.g., peak values of the signal on the line 214) that are indicative of the time delay between the discrete signals x[k] and y[k]. Since voice signals are non-stationary, it would be difficult to use solely the cross correlation to determine time delay as in the prior art. The time delay estimator 200 provides the capacity to determine time delay for discrete signals that are non-stationary.

Figure 3:
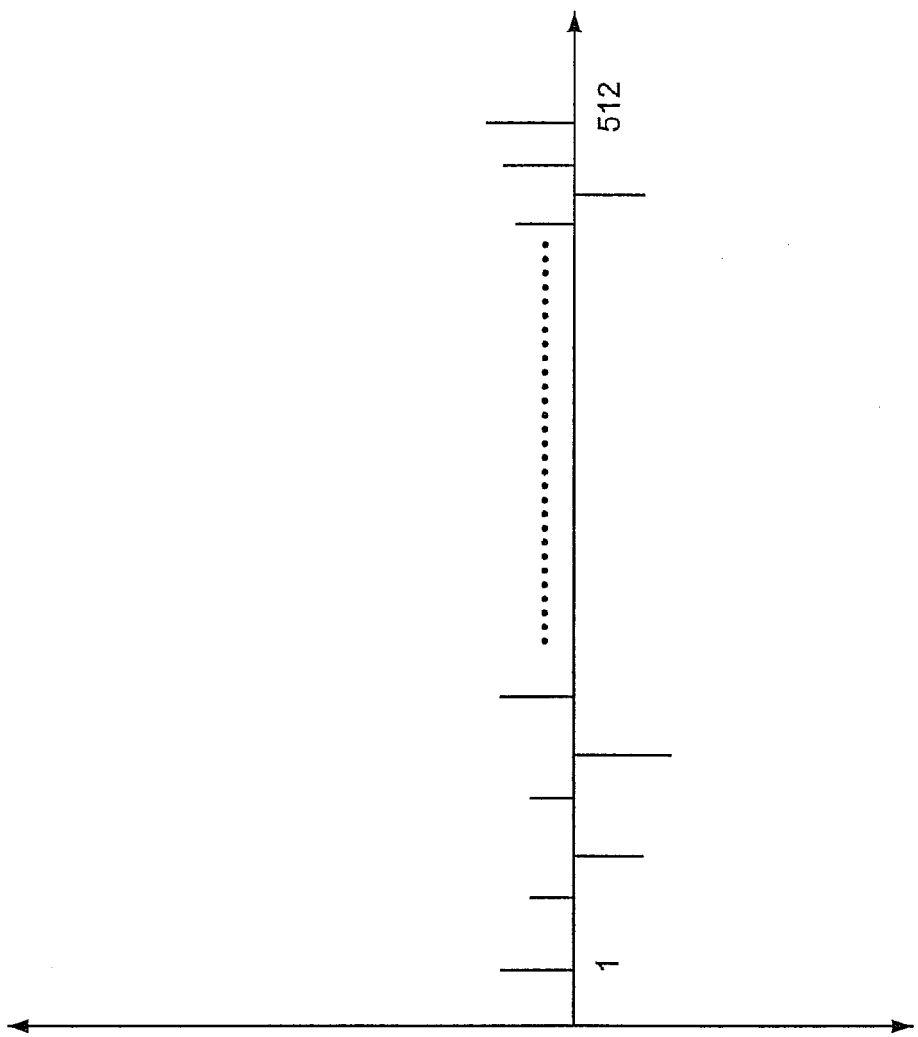
FIG. 3 is a pictorial illustration of a plot of the output of the cross correlator.

FIG. 3 is a simplified plot of the output signal from the cross correlator 202. The cross correlation may be accomplished in a sample-by-sample basis. The correlation computation performed by the sample-by-sample basis may be expressed as:

$$R_\tau[n] = \sum_{i=1}^{n} \lambda^{n-i} x[i] y[i-\tau] \qquad \text{EQ. 1}$$

where n is a sample index value, $\lambda$ is a forgetting factor value, and $\tau$ is a lag index value. The sample index is associated with the number of data values in the downconverted signal. In this case, the sample index value n is 512 since, in this embodiment, each of the downconverted signals on lines 210, 212 (FIG. 2) has 512 data values.

The cross correlation may also be performed on a block-by-block basis, where each block includes signal values over a certain amount of time. The cross correlator 202 computation performed on a block-by-block basis can be expressed as:

$$R_\tau[k] = \sum_{j=1}^{k} \lambda^{k-j} \sum_{i=(k-1)B+1}^{kB} x[i] y[i-\tau] \qquad \text{EQ. 2}$$

where k is a block index value, B is a block length value, $\lambda$ is a forgetting factor value, and $\tau$ is the lag index value. In one embodiment, the block length may be 5 ms. This sort of cross correlation gives a spatial dimension in analyzing the two signals x[k] and y[k]. Since the cross correlator 202 also preferably performs averaging on its input values, it can be shown that the recursive relationship is equivalent to relation EQ. 2 as follows:

$$R_\tau[k] = \lambda R_\tau[k-1] + \sum_{i=(k-1)B+1}^{kB} x[i] y[i-\tau] \qquad \text{EQ. 3}$$

for performing block-by-block cross correlation.

The cross correlation provides output average values that may either be positive or negative. However, the cross correlation output may also contain effects of time delay that are immersed within the signals x[k] and y[k]. The cross correlation output does not provide an accurate description of time delay effects, because the correlated signals are voice signals that exhibit non-stationary properties. As a result, further analysis is needed to compute the time delay estimate.

Referring again to FIG. 2, the cross correlator 202 output signal is input to a lag smoother 204, which also operates on blocks of data. The lag smoother 204 performs a smoothing operation on the cross correlator 202 output signal. For example, the lag smoother 204 computes averages on the cross correlator 202 output using a sliding window computation. The sliding window is spanned across the cross correlator 202 output signal sequence. This filtering approach produces a smaller set of output data values as compared to the number of data values associated with the cross correlator 202 output. In one embodiment, the lag smoother 204 receives as input 512 data values and outputs 32 data values. The reason is that the lag smoother 204 in this embodiment includes a sliding window sized at approximately 24 data values to create each lag smoother output signal sequence. The sliding window may also overlap with input data values using lags of a previous lag smoothing output to produce a next lag smoothing output. The lag smoother 204 computes the average power of the output of the cross correlator 202. Thus, the lag smoother 204 output values are positive values.

Figure 4:
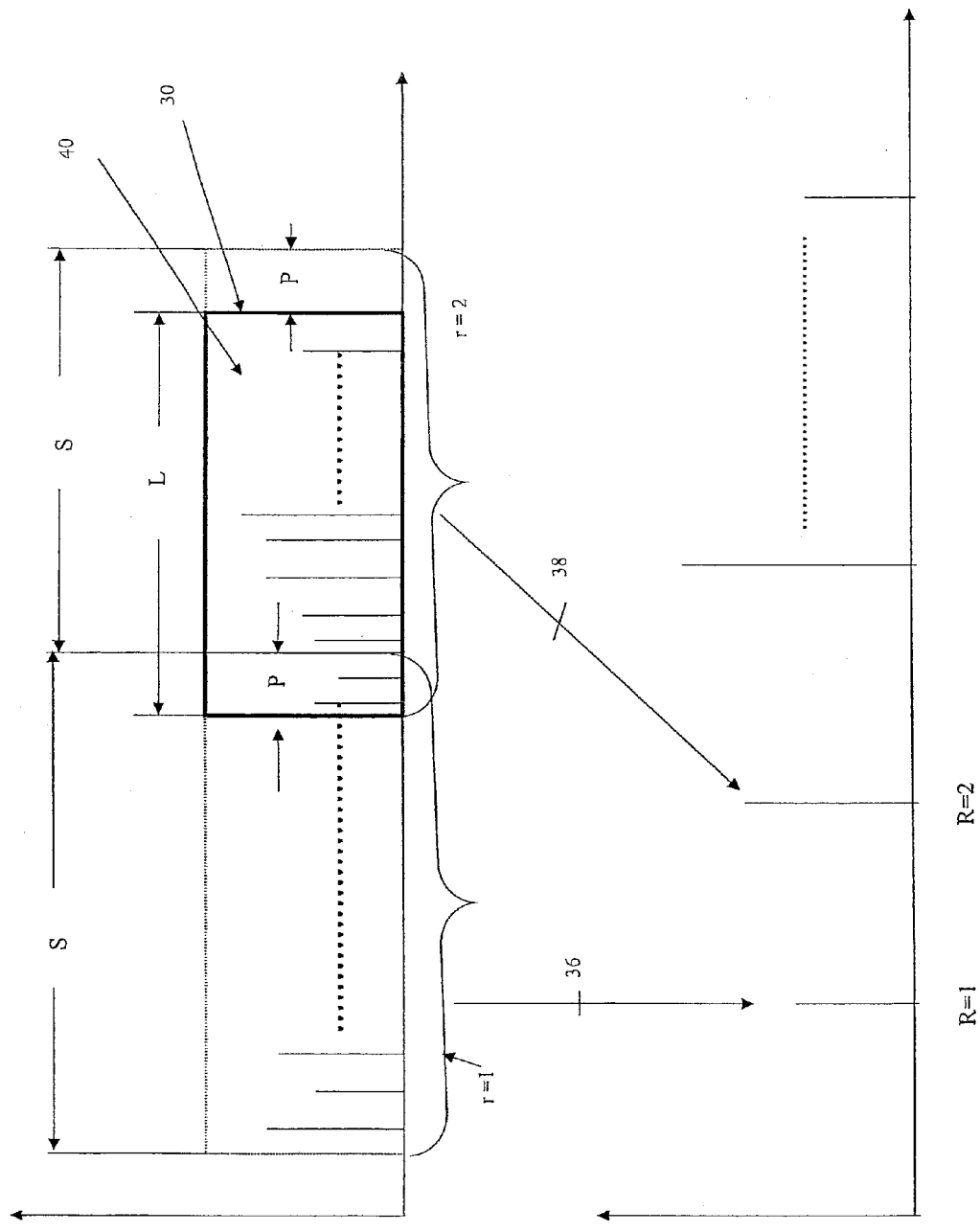
FIG. 4 is a pictorial illustration of a computation performed by the lag smoother.

FIG. 4 is a pictorial illustration of the computational analysis performed by the lag smoother 204. The lag smoother 204 computes the power average of the cross correlated output, and utilizes a sliding window 30. In one embodiment, the sliding window 30 has a size of twenty-four (24) data samples, however one may of course select a different window size S. As shown in FIG. 2, the cross correlator 202 outputs approximately 512 data samples, so for the window size of twenty-four (24) the lag smoother 204 provides thirty-two (32) outputs.

Referring still to FIG. 4, the sliding window 30 performs an average on the data samples stored within the window, which provides a lag smoother output signal value 36. The sliding window 30 is moved to produce a second lag smoother output value 38. The sliding window 30 may overlap with data values/lags used in a previous computation of a lag smoother output that is demonstrated by an overlap region 40.

The lag smoother may compute the output values as follows:

$$\tilde{R}_r[k] = \sum_{i=(r-1)L-P}^{rL+P} R_i^2[k] \qquad \text{EQ. 4}$$

where L is a sliding window size, P is the size of the window overlap, and r is indicative of the number of sets produced by the lag smoother 204. In this embodiment, the value r spans from 1-32, where each value is uniquely associated with one of the lag smoother 204 outputs as shown in FIG. 4 (e.g., lag smoother output signal values 36, 38). Also, the value of L is 16 and the value of P is 4, thus the sliding window 30 is sized at 24, with an overlap of four (4) data entries on either side of sliding window 30. Since the expression in EQ. 4 performs the averaging of squares of the cross correlated outputs, the outputs of the lag smoother 204 are positive.

The outputs from the lag smoother 204 are input to a time smoother/filter 205, which performs temporal averaging. For example, each of the input signals on a block may be input to an associated single pole filter (e.g., an IIR filter). These filters reduce the variance of the lag smoother outputs. The time smoother 205 is an optional but preferable element of the time delay estimator 200, since it further reduces the variance, thus providing a better estimation of the time delay.

Figure 5:
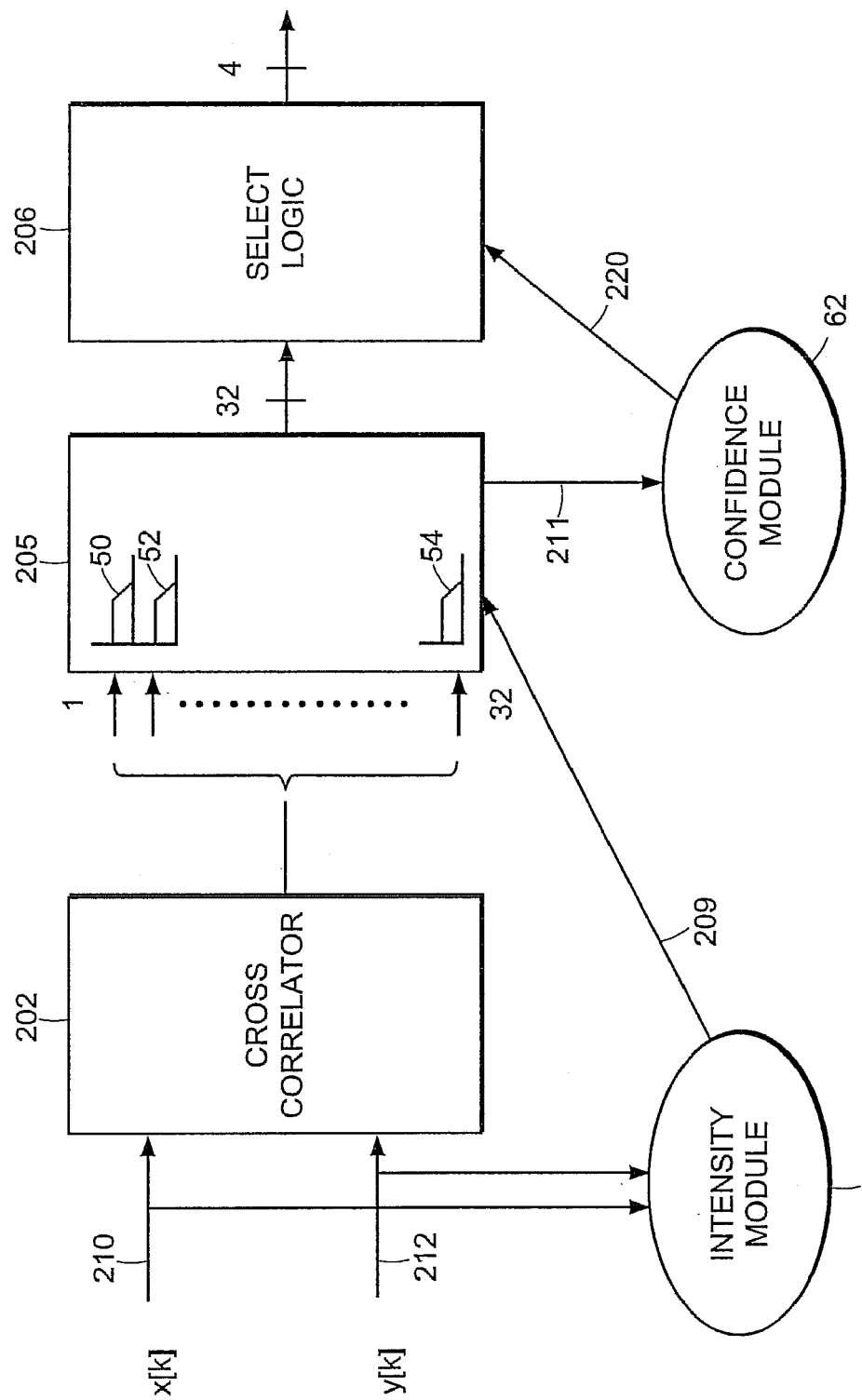
FIG. 5 is a functional block diagram illustration of the time delay estimator

FIG. 5 is a schematic of the time smoother 205, which receives the outputs from the lag smoother 204. The time smoother 205 performs temporal averaging of the outputs of the lag smoother 204. The time smoother 205 includes a plurality of filters (e.g., 50, 52, 54) that receives an associated one of the signals from the lag smoother 204. Each of the filters 50, 52, and 54 is preferably a low-pass filter (e.g., IIR filter) having a single pole. The time smoothing operation can be expressed as:

$$S_r[k]=(1-\alpha)S_r[k-1]+\alpha \tilde{R}_r[k] \qquad \text{EQ. 5}$$

where α is the effective memory length of the each of the plurality of filters (50, 52 and 54), $\tilde{R}_r[k]$ is the set associated with the output of the lag smoother 204, and r corresponds to the indices of the output from the lag smoother 204. In one embodiment, the value of r ranges between 1 and 32. The time smoother 205 also maintains state information in computing its smoothed output.

The time smoother 205 may also perform other functions that aid the select logic module 206 in selecting the associated peak values, if the inputs to the select logic module 206 are from the time smoother 205. For example, if the discrete signals x[k] and y[k] contain low signal values on lines 210 and 212 or solely signal noise, these signals will produce outputs across the cross correlator 202, the lag smoother 204, and the time smoother 205 that are null or insignificant. Therefore, it would be necessary for the select logic module 206 to not replace its previous peak values with new peak values that are null or insignificant. The time smoother 205 notifies a confidence module 62 which in turn notifies the select logic module 206 to maintain its previous state information in such circumstances. Another situation is when the outputs to the time smoother 205 are relatively similar same values, thus there is low confidence on these outputs in producing a reliable time delay estimate because there is very little spread between the outputs in the time smoother 205. In this instance, the time smoother 205 notifies the confidence module 62 that also notifies the select logic module 206 to not change its state by selecting the peak values from its output. This reduces the likelihood of unreliable outputs by the select logic module 206. The confidence module 62 notifies the select logic module 206 preferably using boolean values to signify whether it should change its state, which will be discussed hereinafter.

The time smoother 205 may use an intensity module 60 and the confidence module 62 to determine whether the inputs to the time smoother 205 are reliable enough for the select logic module 206 to select peak values. The intensity module 60 measures whether the inputs to the cross correlator 202 are at an intensity level that is sufficient for selecting peak values at the select logic module 206. The intensity module 60 notifies the time smoother 205 of the measured intensity levels via a signal line 209. The confidence module 62 receives on line 211 from the time smoother 205 an indication whether the intensity levels are at a level appropriate for continued processing of the inputs on the lines 210 and 212. The confidence module 62 provides a boolean signal on line 220 to the select logic module 206 of its determination regarding the reliability that inputs to the time smoother 205 will provide accurate time delay estimates. In general, the partitioning of the task of determining whether the intensity is sufficient to provide confidence that accurate time delay information can be calculated by either time smoother 205 or confidence module 62, et cetera. In any event, a preferred embodiment is a discrete time system and the processing steps are associated with executable software/firmware routines. However, the system of the present invention may also be implemented in an ASIC or general-purpose processor. A boolean signal value of "0" on the line 220 signifies that the confidence that the inputs to the time smoother 205 will produce reliable time delay estimates is low. Similarly, a boolean value of "1" signifies that the confidence that the inputs to the time smoother 205 will produce reliable time delay estimates is high (i.e., not low).

For example, if the intensity module 60 and time smoother 205 determine that the intensity levels of the input signals on the lines 210 and 212 are not appropriate for producing time delay estimates, the time smoother 205 provides an indication to the confidence module 62 of that result. The confidence module 62 outputs a boolean signal value of "0" to the select logic module 206, thus notifying the selector logic module 206 not to change its state. Otherwise, the outputs of the cross correlator 202 are allowed to proceed on to the lag smoother 204. At that point, the time smoother 205 analyzes its inputs to determine whether these values are sufficient for further processing by the select logic module 206. If not, the time smoother 205 notifies the confidence module 62 of this result via line 211, where the confidence module 62 sends a boolean signal of "0" on line 220 to the select logic module 206. This boolean signal value notifies the select logic module 206 not to change its state. Otherwise, if the input to the time smoother 205 is determined to be appropriate for further processing, the time smoother 205 notifies the confidence module 62. The confidence module 62 proceeds to send a boolean signal value of "1" to the select logic module 206, thus allowing the select logic module 206 to change its state by selecting peak values from its inputs.

The outputs of both the lag smoother 204 and the time smoother 205 aid in determining time delay estimation of non-stationary signals, such as voice signals. The outputs of the lag smoother 204 and time smoother 205 provide the peak values used for determining time delay estimates of the non-stationary signals. The major difference between the two outputs is that the time smoother 205 aims in the reduction of the variance of the lag smoother outputs to provide a more reliable output to determine the time delay estimates.

The select logic module 206 can either receive the outputs from the time smoother 205 or the lag smoother 204, as shown in FIG. 2. In determining the time delay estimate, peak values are selected by the select logic module 206, indicative of the time delay estimates. The select logic module 206 selects from its inputs a selective set of high values. For example, the select logic module may select the four signal values. These peak values are stored until a new set of data values that have peak values that are different from those being stored. As mentioned above, the time smoother 205 may also notify the select logic module 206 whether its inputs are desirable values to select a plurality of peak values from by using a confidence module 62 and an intensity module 60. If it is determined that the peak values are not desirable, the select logic module 206 maintains its previously stored peak values, as discussed hereto.

Although the present invention has been shown and described with respect to several preferred embodiments thereof, various changes, omissions and additions to the form and detail thereof, may be made therein, without departing from the spirit and scope of the invention.

What is claimed is:

1. A system for time delay estimation in a discrete time processing system, comprising:

a cross correlator that performs cross correlation on a first signal and a second signal, such that cross correlated output signals are produced, said cross correlator performs cross correlation on a block-by-block basis using the relation $$R_\tau[k] = \lambda R_\tau[k-1] + \sum_{i=(k-1)B+1}^{kB} x[i]y[i-\tau]$$

to define said block-by-block cross correlation, wherein i is a sample index, k is block index, B is a block length, $\tau$ is a lag index, and $\lambda$ is a forgetting factor;
  a lag smoother that performs smoothing on said cross correlated output signals, such that lag smoothed output signals are produced; and
  a select logic module for selecting a pre-defined number of highest peaks from a respective set indicative of said lag smoothed output signals to compute said time delay estimation.

2. The system of claim 1, wherein said first and second signal are outputs from a pair of downconverters.

3. The system of claim 1, wherein said cross correlator performs time weighted cross correlation.

4. The system of claim 1, wherein said cross correlator performs cross correlation on a sample-by-sample basis.

5. The system of claim 1, wherein said lag smoother performs a power average on lags of said cross correlated output signals.

6. The system of claim 5, wherein said lag smoother uses a window of a predefined size to perform said average.

7. The system of claim 6, wherein said window is an overlapping window.

8. The system of claim 7, wherein said window size overlaps with data in said cross-correlation.

9. The system of claim 8, wherein said lag smoother uses the relation $$\tilde{R}_r[k] = \sum_{i=(r-1)L-P}^{rL+P} R_i^2[k]$$

to define output values produced by said lag smoother, wherein L is said window size, P is a size of said overlap, r is a number of said set of lag average cross correlation outputs.

10. The system of claim 1 further comprises a time smoother for performing a time average on a set of lag average correlation outputs and producing said respective set.

11. The system of claim 10, wherein said time smoother comprises a plurality of low pass filters.

12. The system of claim 10, wherein said time smoother is defined as $$S_r[k]=(1-\alpha)S_r[k-1]+\alpha\tilde{R}_r[k]$$

wherein $\alpha$ is the effective length of a filter used by said time smoother to perform a time average of said set of lag average cross correlation outputs.

13. The system of claim 1, wherein first and second signals have sample rates of 4 kHz, respectively.

14. A method of time delay estimation in a discrete time processing system, comprising:
  cross correlating a first signal and a second signal, such that cross correlated output signals are produced on a block-by-block basis using the relation $$R_\tau[k] = \lambda R_\tau[k-1] + \sum_{i=(k-1)B+1}^{kB} x[i]y[i-\tau]$$

to define said block-by-block cross correlation, wherein i is a sample index, k is block index, B is a block length, $\tau$ is a lag index, and $\lambda$ is a forgetting factor;
  smoothing said cross correlated output signals, such that lag smoothed output signals are produced; and
  selecting a pre-defined number of highest peaks from a respective set indicative of said lag smoothed output signals to compute said time delay estimation.

15. The method of claim 14, wherein said first and second signal are outputs from a pair of downconverters.

16. The method of claim 14, wherein said cross correlating includes performing time weighted cross correlation.

17. The method of claim 14, wherein cross correlating includes performing cross correlation on a sample-by-sample basis.

18. The method of claim 14, wherein said smoothing includes performing a power average on lags of said cross correlated output signals.

19. The method of claim 18, wherein said smoothing includes using a window of a predefined size to perform said average.

20. The method of claim 19, wherein said window is an overlapping window.

21. The method of claim 19, wherein said smoothing uses a relation $$\tilde{R}_r[k] = \sum_{i=(r-1)L-P}^{rL+P} R_i^2[k]$$

to define output values produced by said lag smoother, wherein L is said window size, P is a size of said overlap, r is a number of said set of lag average cross correlation outputs.

22. The method of claim 14 further comprises time averaging a set of lag average correlation outputs and producing said respective set.

23. The method of claim 22, wherein said time averaging utilizes a low pass filter to perform said time averaging.

24. The method of claim 22, wherein said time averaging is defined as $$S_r[k]=(1-\alpha)S_r[k-1]+\alpha\tilde{R}_r[k]$$

wherein $\alpha$ is the effective length of a filter used to perform said time average of said set of lag average cross correlation outputs.

25. The method of claim 14, wherein said first and second have sample rates of 4 KHz, respectively.

* * * * *